(12) United States Patent
Qiu et al.

(10) Patent No.: US 9,939,678 B2
(45) Date of Patent: Apr. 10, 2018

(54) BACKLIGHT MODULE

(71) Applicant: SHENZHEN CHINA STAR OPTOELECTRONICS TECHNOLOGY CO., LTD., Shenzhen (CN)

(72) Inventors: Yong yuan Qiu, Shenzhen (CN); Zan jia Su, Shenzhen (CN)

(73) Assignee: SHENZHEN CHINA STAR OPTOELECTRONICS TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 14/416,789

(22) PCT Filed: Sep. 25, 2014

(86) PCT No.: PCT/CN2014/087390
§ 371 (c)(1),
(2) Date: May 9, 2016

(87) PCT Pub. No.: WO2016/033848
PCT Pub. Date: Mar. 10, 2016

(65) Prior Publication Data
US 2017/0168351 A1    Jun. 15, 2017

(30) Foreign Application Priority Data
Sep. 1, 2014 (CN) .......................... 2014 1 0440708

(51) Int. Cl.
*F21V 7/04* (2006.01)
*G02F 1/1335* (2006.01)
*F21V 8/00* (2006.01)

(52) U.S. Cl.
CPC ....... *G02F 1/133606* (2013.01); *G02B 6/005* (2013.01); *G02B 6/0051* (2013.01);
(Continued)

(58) Field of Classification Search
CPC .... G02B 6/005; G02B 6/0051; G02B 6/0053; G02B 6/0068; G02F 1/133603;
(Continued)

(56) References Cited

U.S. PATENT DOCUMENTS 7,052,152 B2 *   5/2006   Harbers ............ G02F 1/133603
                                                        349/71
7,515,143 B2 *   4/2009   Keam ................... G06F 3/0421
                                                        178/18.01
(Continued)

FOREIGN PATENT DOCUMENTS

CN    101883948 A    11/2010
CN    102628580 A    8/2012
(Continued)

*Primary Examiner* — Tsion Tumebo
(74) *Attorney, Agent, or Firm* — Buchanan Ingersoll & Rooney PC

(57) ABSTRACT

A backlight module includes a light-emitting element, which can emit a first light with a wavelength in a first wavelength range, a quantum dot diaphragm, which is formed by combining a plurality of sub-diaphragms each with a small area together and can emit a second light with a wavelength in a second wavelength range and a third light with a wavelength in a third wavelength range, and a diffusing plate used for light homogenization. The defects of low qualified rate of quantum dot diaphragm with large area manufactured currently and a poor homogeneity thereof can be avoided.

6 Claims, 3 Drawing Sheets

(52) U.S. Cl.
CPC ..... *G02B 6/0068* (2013.01); *G02F 1/133603* (2013.01); *G02F 1/133621* (2013.01); *G02B 6/0053* (2013.01); *G02F 2001/133614* (2013.01); *G02F 2202/36* (2013.01)

(58) Field of Classification Search
CPC ......... G02F 1/133606; G02F 1/133621; G02F 2001/133614; G02F 2202/36
USPC ....................................................... 362/618
See application file for complete search history.

(56) References Cited

U.S. PATENT DOCUMENTS

| | | | | |
|---|---|---|---|---|
| 7,819,539 | B2* | 10/2010 | Kim | ...................... H01L 33/507 |
| | | | | 313/110 |
| 9,541,790 | B2* | 1/2017 | Ning | .................. G02F 1/133603 |
| 9,612,476 | B2* | 4/2017 | Qiu | .......................... G02B 6/005 |
| 2010/0187975 | A1* | 7/2010 | Tsukahara | ............ G02B 6/0038 |
| | | | | 313/503 |
| 2010/0246160 | A1 | 9/2010 | Ito et al. | |
| 2011/0051044 | A1* | 3/2011 | Segawa | ............. G02F 1/133606 |
| | | | | 349/64 |
| 2011/0211354 | A1* | 9/2011 | Kim | ........................ H01L 33/20 |
| | | | | 362/311.01 |
| 2012/0113672 | A1* | 5/2012 | Dubrow | ................. B82Y 20/00 |
| | | | | 362/602 |
| 2012/0274882 | A1* | 11/2012 | Jung | ................. G02F 1/133617 |
| | | | | 349/96 |
| 2013/0294107 | A1 | 11/2013 | Ohkawa et al. | |
| 2014/0036203 | A1 | 2/2014 | Guillou et al. | |
| 2014/0071381 | A1 | 3/2014 | Jang et al. | |
| 2014/0211448 | A1 | 7/2014 | Wang | |
| 2015/0226888 | A1 | 8/2015 | Zhu et al. | |

FOREIGN PATENT DOCUMENTS

| | | |
|---|---|---|
| CN | 103090277 A | 5/2013 |
| CN | 103309087 A | 9/2013 |
| CN | 103375772 A | 10/2013 |
| CN | 103823318 A | 5/2014 |

* cited by examiner

The wavelength (nm)

BACKLIGHT MODULE

CROSS REFERENCE TO RELATED APPLICATION

The present application claims benefit of Chinese patent application CN 201410440708.9, entitled "Backlight Module" and filed on Sep. 1, 2014, which is incorporated herein by reference.

FIELD OF THE INVENTION

The present disclosure relates to the technical field of liquid crystal display, and particularly to a backlight module.

BACKGROUND OF THE INVENTION

With the rapid development of the Organic Light-Emitting Diode (OLED) technology, the Liquid Crystal Display (LCD) is facing multiple challenges. Compared with OLED, LCD has certain disadvantages in many aspects, such as thinning, curving, as well as color saturation. More and more attentions are paid to the technological research on these aspects, so that LCD can be comparable to OLED in the aforementioned performances.

With respect to the color saturation, for example, a high color saturation of LCD can be realized through adjusting the Color Filter (CF) of the liquid crystal cell, or using a Light-Emitting Diode (LED) with high color saturation, such as LED element containing red and green phosphor, or LED element containing multicolor wafer, and even LED element using quantum dots as phosphor, as the light source thereof.

The present disclosure provides a backlight module with an improved structure, so that the LCD with high color saturation, for example, the color saturation thereof is higher than 90 percent of the standard of National Television System Committee (NTSC), can be obtained.

SUMMARY OF THE INVENTION

In respect of the aforesaid technical problem, the present disclosure provides a backlight module. An LCD equipped with the backlight module according to the present disclosure will have a relatively higher color saturation compared with an LCD in the prior art. In particular, the color saturation of LCD equipped with the backlight module of the present disclosure is higher than 90 percent of the standard of NTSC.

Meanwhile, the technology of forming quantum dots on a diaphragm is not mature currently. The qualified rate of quantum dot diaphragms with large area manufactured currently is relatively low, or quantum dot diaphragms with large area cannot even be manufactured due to the limitation of manufacturing equipment. Therefore, a special structural design is needed if quantum dot diaphragm is about to be used in large sized backlight module.

The present disclosure provides a backlight module, comprising a light-emitting element, a quantum dot diaphragm, which is formed by combining a plurality of sub-diaphragms each with a small area together, and a diffusing plate used for light homogenization, wherein a light emitted by said light-emitting element excites each quantum dot of said quantum dot diaphragm to emit light.

The present disclosure provides a large sized backlight module which is formed by combining the plurality of quantum dot sub-diaphragms each with a small area together. The whole quantum dot diaphragm is formed by combining the plurality of sub-diaphragms each with a small area together, so that it is not necessary to manufacture and affix a quantum dot diaphragm with large area. In this manner, the defects of low qualified rate of quantum dot diaphragm with large area manufactured currently and a poor homogeneity thereof can be avoided. At the same time, since quantum dot diaphragm can be used to substitute the traditional phosphor, the backlight module according to the present disclosure has a high light-emitting efficiency and color saturation.

Preferably, two diffusing plates, i.e., a first diffusing plate and a second diffusing plate, are provided, the quantum dot diaphragm being affixed on the first diffusing plate, and said light-emitting element is laid on a back of said backlight module, and at a surface of said light-emitting element facing a liquid crystal cell, the first diffusing plate and the second diffusing plate are arranged in sequence along an optical path direction, with a first space formed between the first diffusing plate and the second diffusing plate. In this manner, the light can be atomized and homogenized through the arrangements of the two diffusing plates with the first space therebetween, so that the non-homogeneity and grade difference of the light caused by the seams formed between the sub-diaphragms, which constitute the quantum dot diaphragm, can be neutralized. That is to say, the problem of the grade difference of the light caused by the combination of sub-diaphragms can be solved through the improvement of the structure thereof.

Preferably, said quantum dot diaphragm completely covers the surface of said first diffusing plate. In this manner, the luminous effect of the whole backlight module can be improved to the largest extent, and the space in the backlight module can be utilized effectively.

Preferably, said first space ranges from 3 mm to 15 mm in size. For the backlight module with typical size and the width of the seam obtained through typical technique, the above numerical range enables the first space and the two diffusing plates to cooperate with each other, so that the homogeneity of the light can be realized.

Preferably, said quantum dot diaphragm is fixed on the surface of said first diffusing plate through ultraviolet-curing adhesive.

Preferably, said backlight module is further provided with a light guide plate, and said light-emitting element is arranged on a side of said light guide plate; wherein at a surface of said light guide plate through which a light emits out, the quantum dot diaphragm and a diffusing plate are arranged in sequence along an optical path direction, with a second space formed between said quantum dot diaphragm and said diffusing plate. In this manner, the light can be atomized and homogenized through the arrangements of the diffusing plate and the second space provided between the diffusing plate and the quantum dot diaphragm, so that the non-homogeneity and grade difference of the light caused by the seams formed between the sub-diaphragms, which constitute the quantum dot diaphragm, can be neutralized. That is to say, the problem of the grade difference of the light caused by the combination of sub-diaphragms can be solved through the improvement of the structure thereof.

Preferably, said second space ranges from 3 mm to 15 mm in size. For the backlight module with typical size and the width of the seam obtained through typical technique, the above numerical range enables the second space and the diffusing plate to cooperate with each other, so that the homogeneity of the light can be realized.

Preferably, said light-emitting element is arranged near to one side or two sides of said light guide plate respectively, and said quantum dot diaphragm is affixed on a light-emitting surface of said light guide plate. In this manner, the utilization rate of the light can be improved to the largest extent, and the space occupied by the backlight module can be reduced.

Preferably, said light-emitting element can emit blue light, and said quantum dots can emit red light and green light. In this manner, the three groups of light emitted therein constitute the three primary colors of the backlight module respectively.

Preferably, said light-emitting element comprises a light-emitting diode array and a corresponding lens array that is located on a light-emitting surface of said light-emitting diode, and said backlight module further comprises a prism group for increasing a brightness of a light emitted by said backlight module. The lens array can regulate the light emitted by the LED, so as to improve the utilization rate of the light thereof. The prism group can increase the utilization rate of the light of the backlight module.

The above technical features can be combined in any suitable manner, or substituted by the equivalent technical features, as long as the purpose of the present disclosure can be achieved.

BRIEF DESCRIPTION OF THE DRAWINGS

The present disclosure will be illustrated in detail hereinafter with reference to the embodiments and the accompanying drawings.

Figure 1:
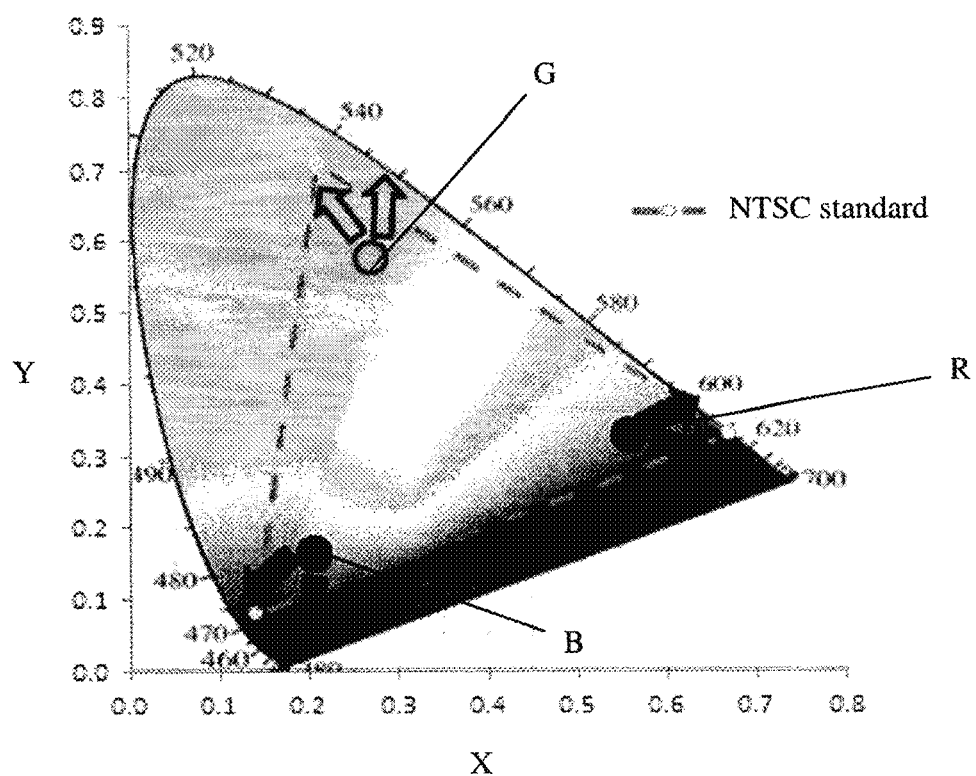
FIG. 1 schematically shows a Commission Internationale de L'Eclairage (CIE) 1931 chromaticity diagram, wherein a NTSC standard color gamut is shown by dash dot lines, and the color gamut of the red light, green light, and blue light emitted by a backlight module are shown by three dots of R, G, and B respectively.

In the drawings, the same components are represented by the same reference signs, and the size of each component does not represent the actual size of the corresponding component.

DETAILED DESCRIPTION OF THE EMBODIMENTS

The present disclosure will be illustrated further with reference to the drawings.

In principle, in order to achieve high color saturation, the area of a triangle formed by the pure color points (R, G, and B) of an LCD can be extended as much as possible in the CIE 1931 color coordinate, so that a larger color coverage can be obtained.

FIG. 1 schematically shows a CIE 1931 chromaticity diagram, wherein a NTSC standard color gamut is shown by dash dot lines, and the color gamut of the red light, green light, and blue light emitted by a backlight module are shown by three dots of R, G, and B respectively. It is easy to understand that, the area of the triangle formed by the R, G, and B color points of the backlight module can be enlarged, i.e., the color coverage of the light emitted by a display that is equipped with said backlight module can be extended, through the following two methods.

(1) The half peak widths of the spectra corresponding to the R, G, and B color points of the backlight module can be reduced, so that the color coordinates of the R, G, and B color points will approach to the edges of the CIE 1931 chromaticity diagram; and (2) The longer the wavelength of the red light corresponding to the peak (the R color point) is, the nearer to 520 nm the wavelength of the green light corresponding to the peak (the G color point) is, and the shorter the wavelength of the blue light corresponding to the peak (the B color point) is, the larger the area of the triangle formed thereby representing the color coverage will be, the larger the color coverage of the display that is equipped with said backlight module will be, and the higher the color saturation thereof will be.

Figure 2:
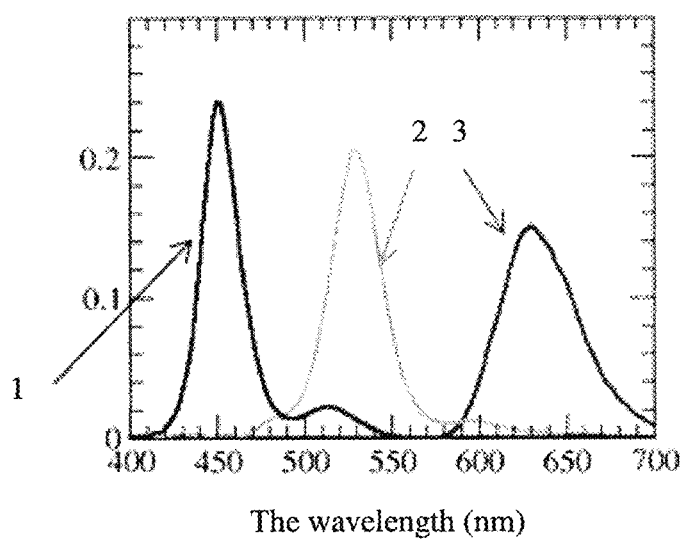
FIG. 2 schematically shows the relative light-emitting peaks of the red light, blue light, and green light emitted by the backlight module respectively, whereby a display effect of the backlight module according to the present disclosure is illustrated.

On the one hand, the above method (1) can be realized through increasing the thickness of the color filter, whereby the half peak widths of the spectra corresponding to the R, G, and B color points can be reduced, which can be understood in combination with FIG. 2; and on the other hand, both the method (1) and the method (2) can be optimized through regulating the light source thereof.

As a new implementation of the light source with high color saturation, the quantum dot technology is drawing more and more attention. As a luminous material, the quantum dot is similar to phosphor, which is excited by the energy of shortwave. The light-emitting peak of the quantum dots can be regulated through adjusting the diameters (which are less than 10 nm) of the quantum dots.

FIG. 2 schematically shows the relative light-emitting peaks of the red light 3, blue light 1, and green light 2 emitted by the backlight module respectively, whereby a display effect of the backlight module according to the present disclosure is illustrated. As a light source with high color saturation, the quantum dots have the following advantages: (1) the half peak width of the quantum dots is relatively narrow, generally in a range of 30 nm to 40 nm; and (2) the peaks of the light source can be regulated through adjusting the material and size of the quantum dots. The ordinary LED backlight module does not have the aforesaid two features, and thus the quantum dot backlight module has its unique advantages.

In the current technical field of liquid crystal display, the quality of the backlight module can be improved through the following three methods, including: (1) packaging the quantum dots in the LED; (2) packaging the quantum dots in a glass tube which is located in front of the LED; and (3) packaging the quantum dots on a diaphragm which is arranged in a diaphragm framework of the backlight module.

The backlight module according to the present disclosure is further improved on the basis of the above method (3), with a blue LED as the light-emitting element (which is used for emitting blue light and exciting the quantum dots), so that the function of the whole backlight module can be realized.

However, the technology of making quantum dots on a diaphragm is not mature currently. The qualified rate of quantum dot diaphragms with large area manufactured currently is relatively low, or quantum dot diaphragms with large area cannot even be manufactured due to the limitation of manufacturing equipment. Therefore, a special structural design is needed if quantum dot diaphragm is about to be used in large sized backlight module.

The present disclosure provides a large sized backlight module which is formed by combining a plurality of quantum dot sub-diaphragms each with a small area together. The structure of the backlight module of the present disclosure is further improved, so that the technical problem of display difference caused by seams between the sub-diaphragms each with a small area can be solved.

Figure 3:
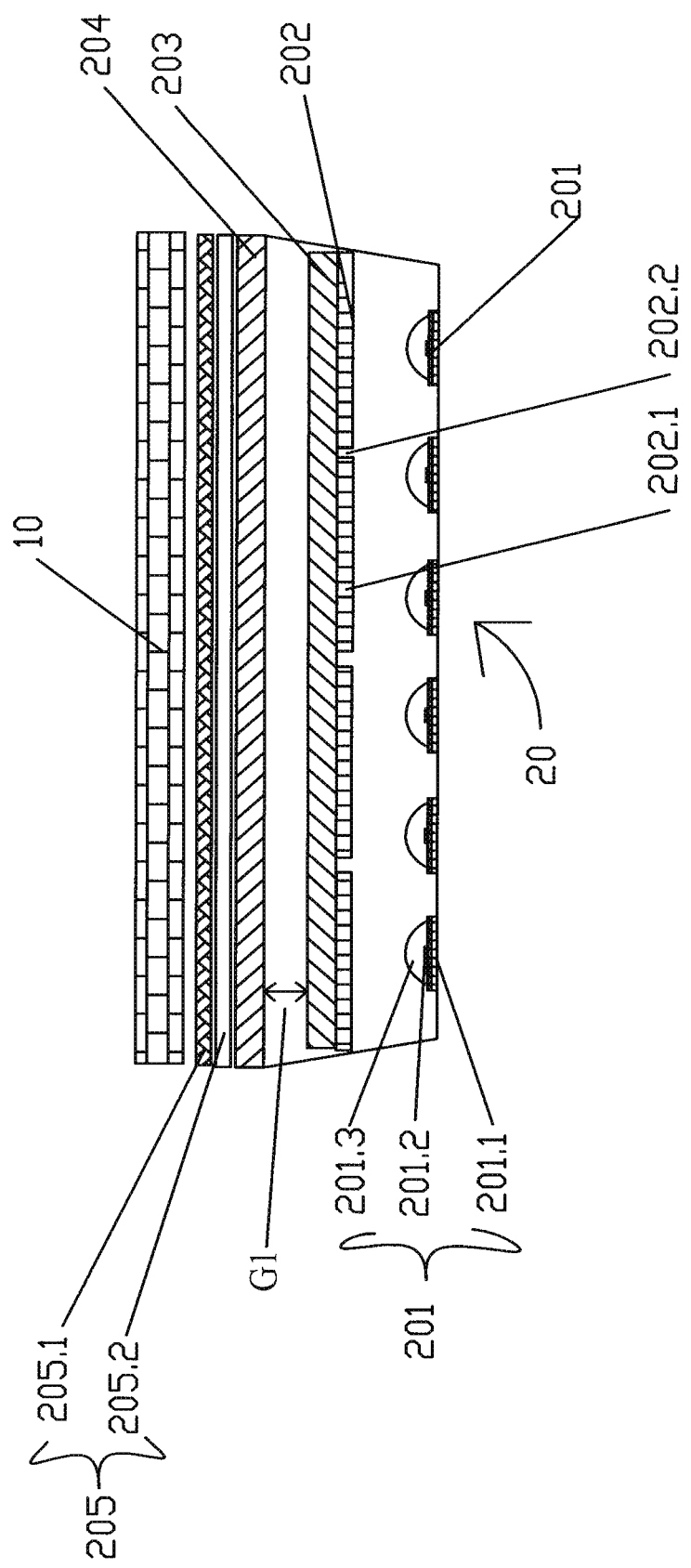
FIG. 3 schematically shows a first embodiment of a backlight module according to the present disclosure.

FIG. 3 schematically shows a first embodiment of a backlight module according to the present disclosure. Reference can be made to FIG. 3, wherein a backlight module 20 is provided by the present disclosure. According to the first embodiment as shown in FIG. 3, the backlight module 20 is a direct type backlight module, that is, a plurality of light-emitting elements 201 are laid on a back of a LCD, which will be illustrated in detail hereinafter.

The backlight module 20 comprises the light-emitting elements 201 which can emit a first light with a wavelength in a first wavelength range. Preferably, since the light-emitting efficiency of blue LED is relatively high in the prior art, in the present embodiment, the first wavelength range is specifically the wavelength range of blue light. That is, the first light is blue light.

The light-emitting elements 201, as the light source for excitation, can be realized in a variety of forms. For example, the light-emitting elements 201 may comprise a light-emitting diode array and a corresponding lens array that is located on a light-emitting surface of said light-emitting diode. Further, the LED may comprise a bracket 201.1, a light-emitting chip 201.2 that is fixed on the bracket 201.1, and a transparent packaging material 201.3 that is packaged outside the light-emitting chip 201.2.

A quantum dot diaphragm 202 is provided on an upper side (i.e., a light-emitting surface) of the light-emitting elements 201. It can be seen clearly from FIG. 3 that, the quantum dot diaphragm 202 is formed by combining a plurality of sub-diaphragms 202.1 each with a small area together. Seams 202.2 are formed between two adjacent sub-diaphragms 202.1 due to technical limitations. Different quantum dots of the quantum dot diaphragm 202, after being excited by the blue light emitted by the light-emitting elements 201, can emit a second light with a wavelength in a second wavelength range and a third light with a wavelength in a third wavelength range. In order to form the three primary colors with the blue light emitted by the light-emitting elements 201, the second wavelength range can be the wavelength range of red light, and the third wavelength range can be the wavelength range of green light. That is to say, for the whole backlight module 20, the first light is blue light, the second light is red light, and the third light is green light.

As shown in FIG. 3, the backlight module 20 further comprises two diffusing plates used for light homogenization. According to the first embodiment as shown in FIG. 3, two diffusing plates, i.e., a first diffusing plate 203 and a second diffusing plate 204, are provided. A first space G1 is formed between the first diffusing plate 203 and the second diffusing plate 204. The size of G1 is determined by the width of the seams 202.2 formed between two adjacent sub-diaphragms 202.1. The first diffusing plate 203, the second diffusing plate 204, and the first space G1 formed between the first diffusing plate 203 and the second diffusing plate 204 are used for atomizing and homogenizing the light, so that the non-homogeneity of the strength and the color of the light caused by the seams 202.2 between two adjacent sub-diaphragms 202.1 of the quantum dot diaphragm 202 can be neutralized, and thus a better light-emitting effect of the whole backlight module 20 can be ensured. Preferably, the size of the first space G1 ranges from 3 mm to 15 mm in size, which is the optimized range selected according to the width of the seams 202.2 resulted from current techniques.

The quantum dot diaphragm 202 can be fixed on the surface of said first diffusing plate 203 through ultraviolet-curing adhesive. Specifically, the quantum dot diaphragm 202, which is formed by combining the plurality of sub-diaphragms 202.1 together, can be attached to a lower surface of the first diffusing plate 203, or an upper surface of the first diffusing plate 203. The ultraviolet-curing adhesive can be coated between the quantum dot diaphragm 202 and the first diffusing plate 203, and then the quantum dot diaphragm 202 can be fixed on the first diffusing plate 203 through ultraviolet-curing techniques.

In order to improve the utilization rate of the space of the backlight module 20 to the largest extent, the quantum dot diaphragm 202 (i.e., the plurality of sub-diaphragms 202.1) can be arranged to completely cover the surface of the first diffusing plate 203.

Viewed along the optical path direction, a prism group 205 is arranged on the second diffusing plate 204 for increasing a brightness of a light emitted by the backlight module 20. Specifically, the prism group 205 comprises a vertical prism 205.1 and a horizontal prism 205.2. It can be seen clearly from FIG. 3 that, a liquid crystal cell 10 is arranged on the prism group 205.

The optical path will be illustrated taking the backlight module 20 as shown in FIG. 3 as an example. In the backlight module 20, first, the light-emitting elements 201 emit blue light, which then enters into the quantum dot diaphragm 202. The plurality of quantum dots of the quantum dot diaphragm 202 are excited by the blue light, so as to emit red light and green light respectively. Then, the blue light, red light, and green light are atomized and homogenized after passing through the first diffusing plate 203, the first space G1, and the second diffusing plate 204 that are arranged in sequence, whereby the light with relatively high homogeneity can be formed. In this case, the non-homogeneity of the light caused by the seams 202.2 formed between two adjacent sub-diaphragms 202.1 of the quantum dot diaphragm 202 can be neutralized. The blue light, red light, and green light emit from the second diffusing plate 204 are further processed by the prism group 205, and then emit out and enter into the liquid crystal cell 10.

Of course, as to the circumstance of the quantum dot diaphragm 202 being affixed on the upper surface of the first diffusing plate 203, the optical path will be illustrated below. The blue light, emitted by the light-emitting elements 201, is homogenized by the first diffusing plate 203, and then enters into the quantum dot diaphragm 202 to excite the quantum dots to emit red light and green light. Then, the blue light, red light, and green light are homogenized similarly after passing through the first space G1 and the second diffusing plate 204, whereby the non-homogeneity of the light caused by the seams 202.2 formed between two adjacent sub-diaphragms 202.1 of the quantum dot diaphragm 202 can be neutralized. The optical path in the following part is similar to the situation as shown in FIG. 3, the details of which are no longer repeated here.

Figure 4:
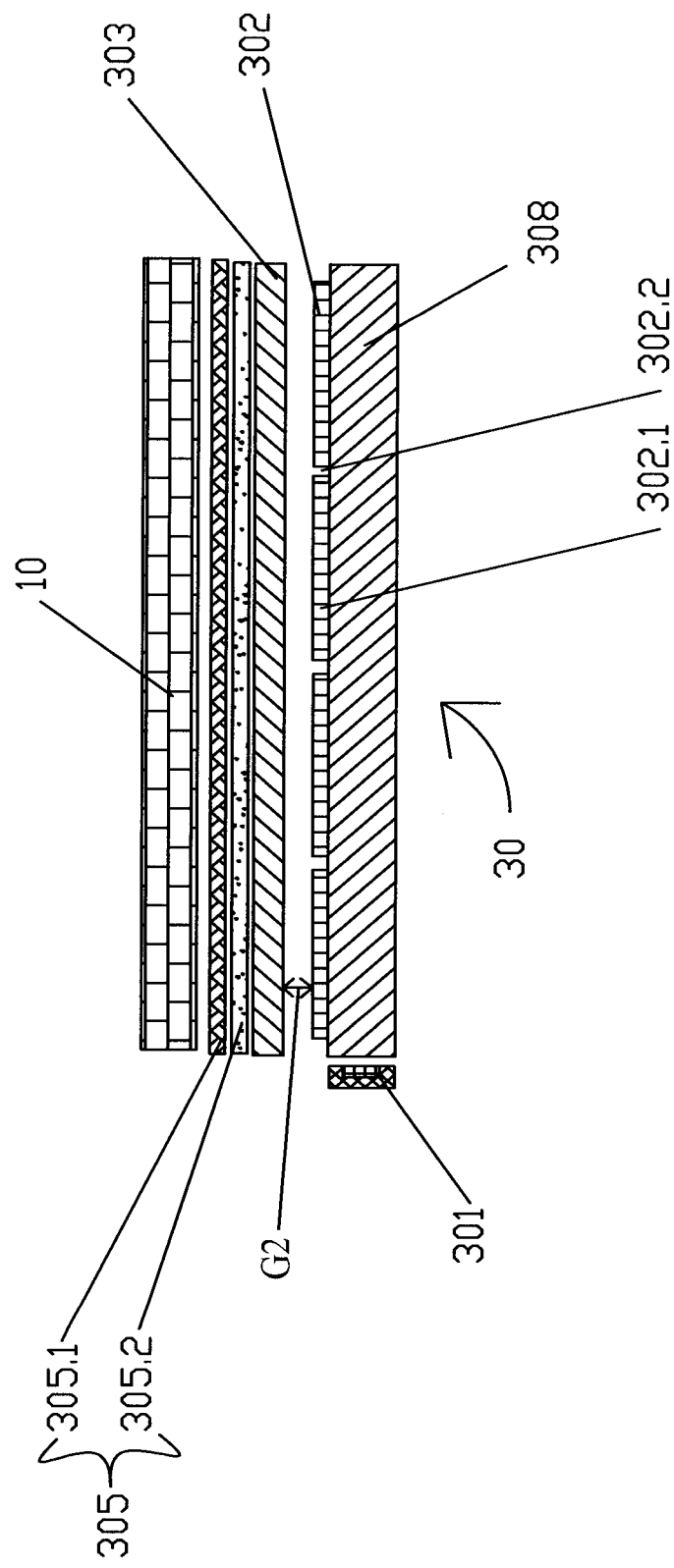
FIG. 4 schematically shows a second embodiment of a backlight module according to the present disclosure.

FIG. 4 schematically shows a second embodiment of a backlight module according to the present disclosure. Reference can be made to FIG. 4, wherein a backlight module 30 is further provided by the present disclosure. According to the second embodiment as shown in FIG. 4, the backlight module 30 is a side type backlight module.

The backlight module 30 comprises a light guide plate 308, which is arranged at a back of a LCD. A light-emitting element 301 is arranged near to a side of the light guide plate 308, i.e., near to a light-entering surface of the light guide plate 308. The light-emitting element 301 can be arranged near to one side or two sides of the light guide plate 308 respectively.

The light-emitting element 301 can emit a first light with a wavelength in a first wavelength range. Preferably, since the light-emitting efficiency of blue LED is relatively high in the prior art, in the present embodiment, the light-emitting element 301 can specifically be blue LED. That is to say, the first wavelength range is the wavelength range of blue light, i.e., the first light is blue light.

A quantum dot diaphragm 302 is attached to a light-emitting surface (i.e., the upper surface as shown in FIG. 4) of the light guide plate 308. It can be seen clearly from FIG. 4 that the quantum dot diaphragm 302 is formed by combining a plurality of sub-diaphragms 302.1 together. Seams 302.2 are formed between two adjacent sub-diaphragms 302.1 due to technical limitations. Different quantum dots of the quantum dot diaphragm 302, after being excited by the first light, which is emitted by the light-emitting element 301 and then emits out after passing through the light guide plate 308, can emit a second light with a wavelength in a second wavelength range and a third light with a wavelength in a third wavelength range. In order to form the three primary colors with the blue light emitted by the light-emitting element 301, the second wavelength range can be the wavelength range of red light, and the third wavelength range can be the wavelength range of green light. That is to say, for the whole backlight module 30, the first light is blue light, the second light is red light, and the third light is green light.

As shown in FIG. 4, the backlight module 30 further comprises a diffusing plate 303 used for light homogenization. According to the second embodiment as shown in FIG. 4, a second space G2 is formed between the quantum dot diaphragm 302 and the diffusing plate 303. The size of G2 is determined by the width of the seams 302.2 formed between two adjacent sub-diaphragms 302.1. The diffusing plate 303 and the second space G2 are used for homogenizing the light, so that the non-homogeneity of the strength and the color of the light caused by the seams 302.2 between two adjacent sub-diaphragms 302.1 of the quantum dot diaphragm 302 can be neutralized, and thus a better light-emitting effect of the whole backlight module 30 can be ensured. Preferably, the size of the second space G2 ranges from 3 mm to 15 mm in size, which is the optimized range selected according to the width of the seams 302.2 resulted from current techniques.

Viewed along the optical path direction, a prism group 305 is arranged on the diffusing plate 303 for increasing a brightness of a light emitted by the backlight module 30. Specifically, the prism group 305 comprises a vertical prism 305.1 and a horizontal prism 305.2. It can be seen clearly from FIG. 4 that, a liquid crystal cell 10 is arranged on the prism group 305.

In the backlight module 30, first, the light-emitting element 301 emits blue light, which then enters into the light guide plate 308 through a light-entering surface thereof, and emits out from a light-emitting surface thereof after passing through the quantum dot diaphragm 302 provided therein. The plurality of quantum dots of the quantum dot diaphragm 302 are excited by the blue light, so as to emit red light and green light respectively. Then, the blue light, red light, and green light are atomized and homogenized after passing through the second space G2 and the diffusing plate 303 that are arranged in sequence, whereby the light with relatively high homogeneity can be formed. In this case, the non-homogeneity of the light caused by the seams 302.2 formed between two adjacent sub-diaphragms 302.1 of the quantum dot diaphragm 302 can be neutralized. The blue light, red light, and green light emit from the diffusing plate 303 are further processed by the prism group 305, and then emit out and enter into the liquid crystal cell 10.

The present disclosure provides a large sized backlight module which is formed by combining the plurality of quantum dot sub-diaphragms each with a small area together. The whole quantum dot diaphragm is formed by combining the plurality of sub-diaphragms each with a small area together, so that it is not necessary to manufacture and affix a quantum dot diaphragm with large area. In this manner, the defects of low qualified rate of quantum dot diaphragm with large area manufactured currently and a poor homogeneity thereof can be avoided. At the same time, since quantum dot diaphragm can be used to substitute the traditional phosphor, the backlight module according to the present disclosure has a high light-emitting efficiency and color saturation.

In a word, since the manufacturing technique of large sized quantum dot diaphragm is not mature, the qualified rate of small sized diaphragm manufactured currently and the homogeneity thereof can meet the requirements of display products. Therefore, the large sized diaphragm can be formed through combining a plurality of small sized sub-diaphragms together, whereby the qualified rate of the products can be improved, the cost thereof can be saved, and the requirements of the products can be met. At the same time, according to a preferred technical solution of the present disclosure, the non-homogeneity of the light caused by the seams formed between two adjacent sub-diaphragms can be neutralized.

The present disclosure is explained in detail in combination with specific examples hereinabove, but the embodiments disclosed herein can be improved or substituted without departing from the protection scope of the present disclosure. In particular, as long as there are no structural conflicts, the technical features disclosed in each and every embodiment of the present disclosure can be combined with one another in any way, and the combined features formed thereby are within the protection scope of the present disclosure. The present disclosure is not limited by the specific embodiments disclosed herein, but includes all technical solutions falling into the protection scope of the claims.

The invention claimed is:

1. A backlight module, comprising a light-emitting element, a quantum dot diaphragm, which is formed by combining a plurality of sub-diaphragms each with a small area together, with seams formed between two adjacent sub-diaphragms, and a diffusing plate used for light homogenization, wherein a light emitted by said light-emitting element excites each quantum dot of said quantum dot diaphragm to emit light, wherein a first diffusing plate and a second diffusing plate are provided, the quantum dot diaphragm being affixed on the first diffusing plate, and said light-emitting element is laid on a back of said backlight module, and at a surface of said light-emitting element facing a liquid crystal cell, the first diffusing plate and the second diffusing plate are arranged in sequence along an optical path direction, with a first space formed between the first diffusing plate and the second diffusing plate, with a dimension of the first space, on a normal direction of the first diffusing plate, determined by a width of the seams formed between two adjacent sub-diaphragms.

2. The backlight module according to claim 1, wherein said quantum dot diaphragm completely covers the surface of said first diffusing plate.

3. The backlight module according to claim 2, wherein said dimension of the first space ranges from 3 mm to 15 mm in size.

4. The backlight module according to claim 3, wherein said quantum dot diaphragm is fixed on the surface of said first diffusing plate through ultraviolet-curing adhesive.

5. The backlight module according to claim 1, wherein said light-emitting element is capable of emitting blue light, and said quantum dots are capable of emitting red light and green light.

6. The backlight module according to claim 1, wherein said light-emitting element comprises a light-emitting diode array and a corresponding lens array that is located on a light-emitting surface of said light-emitting diode, and said backlight module further comprises a prism group for increasing a brightness of a light emitted by said backlight module.

* * * * *